Aug. 11, 1925.

S. B. WINN

TRACTOR

Filed July 2, 1923

1,548,969

2 Sheets-Sheet 2

Inventor

Sidney B. Winn,

By

Attorneys

Patented Aug. 11, 1925.

1,548,969

UNITED STATES PATENT OFFICE.

SIDNEY B. WINN, OF LAPEER, MICHIGAN.

TRACTOR.

Application filed July 2, 1923. Serial No. 648,965.

*To all whom it may concern:*

Be it known that I, SIDNEY B. WINN, a citizen of the United States of America, residing at Lapeer, in the county of Lapeer and State of Michigan, have invented certain new and useful Improvements in Tractors, of which the following is a specification, reference being had therein to the accompanying drawings.

This invention relates to tractors especially designed for moving trailers or other vehicles that may be conveniently coupled to the tractors, and my invention aims to utilize a well known type of tractor for trailer moving purposes. In order to do this I find it necessary to provide a tractor attachment which will increase the wheel base of an ordinary tractor and convert it into a vehicle to which a trailer or other vehicle may be easily coupled. In referring to an ordinary and conventional form of tractor I have in mind the "Fordson" tractor which consists of having a few parts that may be easily separated to permit of an interposed part being used to increase the wheel base of the tractor and afford a substantial support for a tractor frame, on which I may place a cab and part of the coupling mechanism which I have heretofore used for connecting a trailer to a tractor other than that type herein disclosed. The tractor attachment therefore includes an extension member interposed between the power plant and transmission casing of the Fordson tractor, a frame that may be supported from the power plant and transmission casing, a cab on the frame, a coupling mechanism on the frame in proximity to the cab, and the usual control devices for the clutch, transmission mechanism and steering mechanism of the Fordson tractor.

The manner in which I convert a Fordson tractor for my purposes will be hereinafter described and then claimed and reference will now be had to the drawings, wherein—

Figure 1:
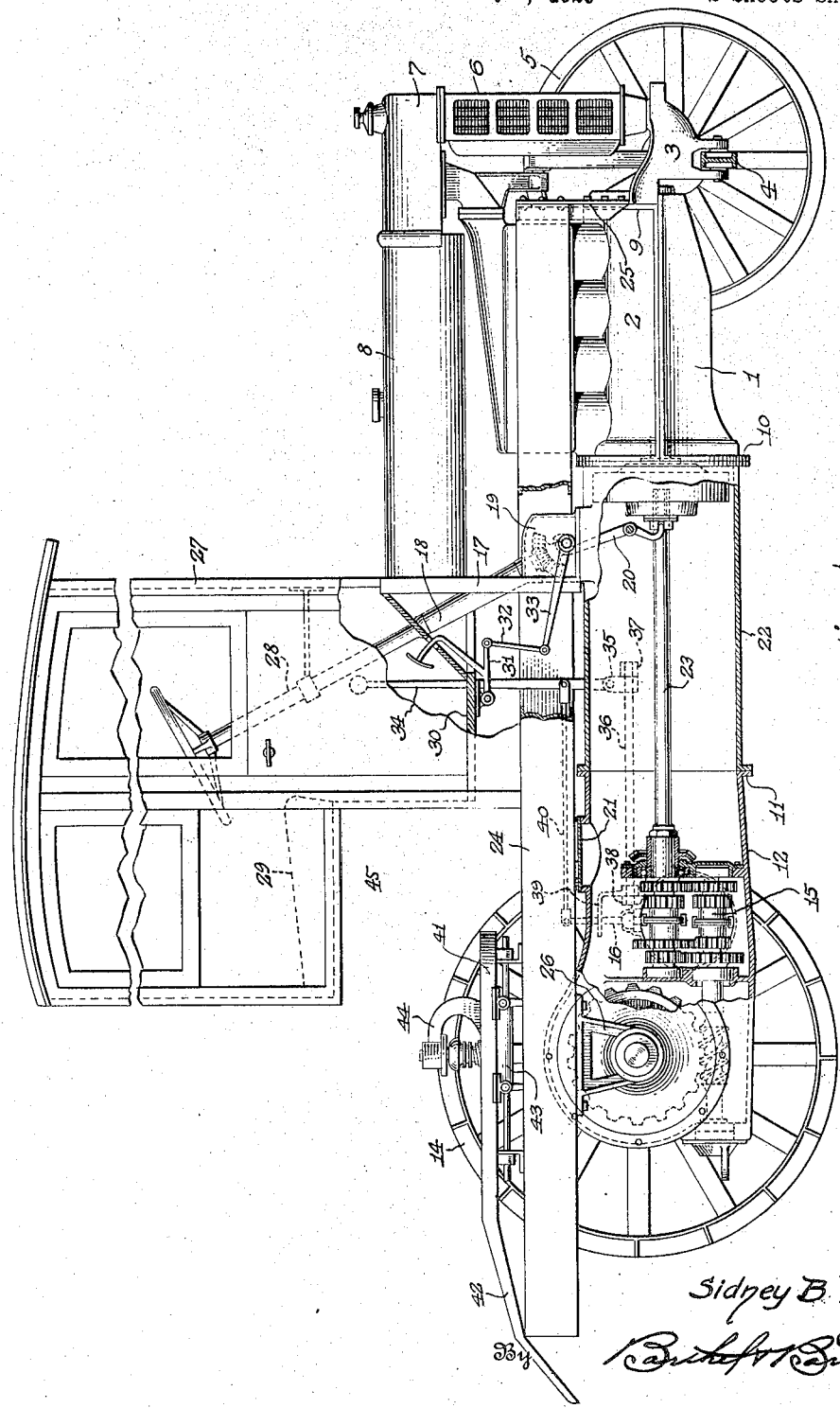
Figure 2:
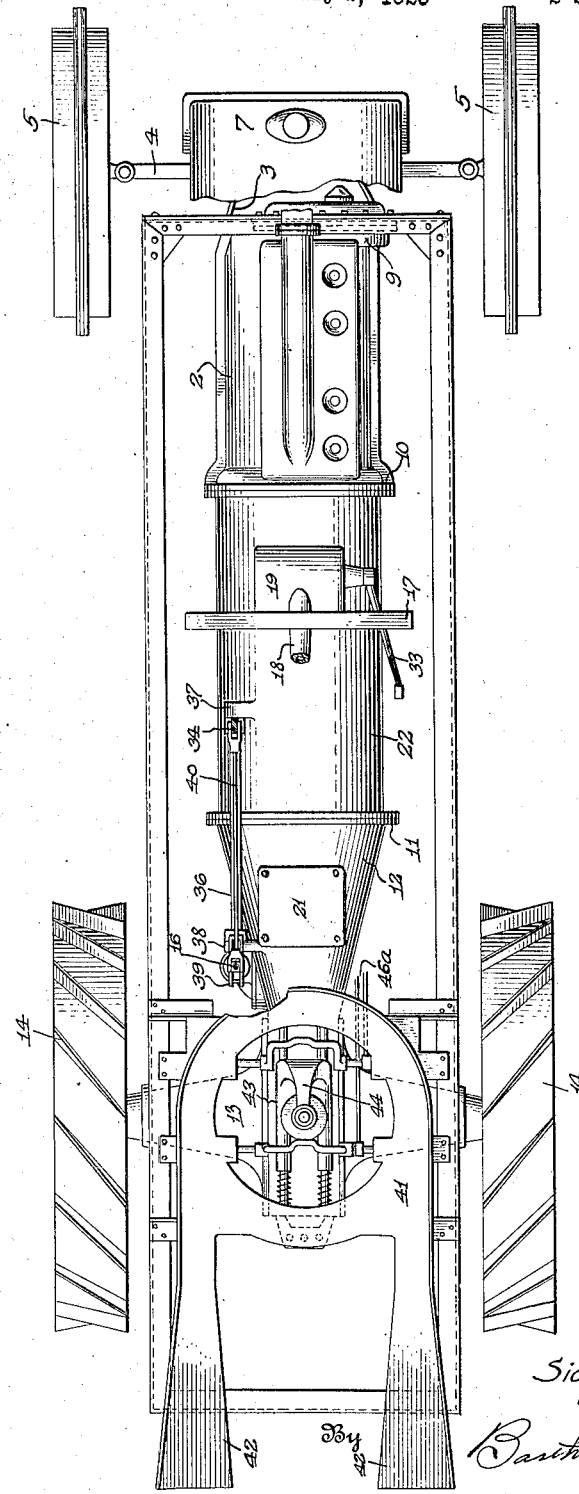

Figure 1 is a side elevation of the tractor partly broken away and partly in longitudinal section, and Fig. 2 is a plan of the same devoid of the cab and partly broken away.

The Fordson tractor as extensively used includes separable parts, a fore part having, among other things, a crank case 1, a cylinder block 2, a front end bearing 3, a front axle 4, front wheels 5, a radiator 6, a water tank 7, and a fuel tank 8, these various elements contributing to the power plant of the tractor. The crankcase 1 and the cylinder block 2 have flanges 9 and 10 and the latter are ordinarily bolted to the flanges 11 of the aft part of the tractor, which includes a transmission casing 12, a rear axle assembly 13, rear driven wheels 14, and a transmission mechanism 15 within the casing 12. The transmission mechanism includes shiftable gears actuated by a change speed lever 16 and on the casing 12 is usually mounted a dash assembly 17 including a steering column 18, and a housing 19 for the upper end of a clutch lever 20. The dash assembly is removed from the transmission casing 12 and the usual opening in the transmission casing 12 may be closed by a plate 21.

In order that I may increase the wheel base of the tractor and utilize it for my purposes, I disconnect the flanges 11 and 12 and separate the fore and aft parts sufficiently to permit of an interposed part or hollow extension casing 22 being placed between the flanges 10 and 11 and bolted or otherwise connected thereto, so that the interposed part 22 will maintain a rigid tractor body. Since the transmission mechanism 15 has been separated from the power plant of the tractor, I install an extension drive shaft 23 by which power may be transmitted from the forward end of the tractor to the rear end thereof. The dash assembly which has been removed from the transmission casing 12 is now mounted on the interposed part or casing 22, as clearly shown in Fig. 1, and I make certain changes in the control devices for the tractor, as will hereinafter appear.

In a horizontal plane above the tractor body is an oblong rectangular frame or chassis 24 which has its forward end attached to the flanges 9 or the forward end of the power plant by suitable brackets or supports 25, and the rear end of the frame, at the sides of the frame, is supported by brackets 26 from the rear axle assembly. The dash assembly having been transferred to the interposed part or extension casing 22 supports the rear end of the fuel tank 8 in the usual manner and on the frame 24, at the dash assembly, I mount a cab 27 in which is placed a steering column extension 28 convenient to an operator's seat 29. In order that the levers 16 and 20 may be actuated from within the cab 27, I provide a cab floor 30 with a pivoted clutch pedal 31 con nected by a link 32 to a clutch crank 33 adapted to actuate the lever 20. Extending through the cab floor 30 is a gear shift lever 34 which extends downwardly to the extension casing 22 and is pivotally attached to a bearing 35 on a longitudinal rock shaft 36 supported by bearings 37 and 38 of the casings 22 and 12 respectively. By laterally swinging the gear shift lever 34 the shaft 36 may be rocked and said shaft, adjacent the bearing 38, has a fork 39 engaging the lever 16 to rock said lever in the usual manner preparatory to shifting certain gears. The gear shift lever 34 can also be moved independent of any rocking movement of the shaft 36 and said gear shift lever is connected by a rod 40 to the lever 16, so that after said lever has been adjusted through the medium of the rock shaft 36 it may be further adjusted to longitudinally shift certain gears and provide for certain speed or reverse in connection with the transmission mechanism.

As set forth in the beginning I have changed the Fordson tractor so that it may be utilized for moving trailers or other vehicles coupled to the rear end of the frame 24, especially a trailer or vehicle body of that type disclosed in my pending applications filed Nov. 24, 1922, Ser. No. 602,928 and Jan. 8, 1923, Ser. No. 611,319. These trailers or bodies are adapted to have the forward ends thereof supported by and coupled to a tractor, which may be backed under the forward end of the trailer or body. Therefore, I provide the rear end of the frame 24 with a platform or turntable 41, an inclined track 42, a draft rigging 43, and a coupling device 44, said coupling device having control rods or elements 46 that may extend to the cab 27 so as to be operated from therein. For the sake of clearness in illustrating my invention, the control elements within the cab for controlling the coupling device, trailer brakes, etc., has not been shown, but such elements will be found in my pending application.

The cab 27 is somewhat along the lines of the cab shown in my pending application, Ser. No. 602,928 above referred to, the cab having a pocket or undercut portion 45 providing clearance for the forward end of the trailer or low body vehicle, so that there will be a comparatively short coupling between the tractor and trailer combination.

In converting a Fordson tractor to the purposes of my invention I do not destroy its usefulness for moving vehicles or implements, other than my trailers, as access can at all times be had to the rear axle assembly for the attachment of vehicles or implements thereto.

What I claim is:—

1. As a means for lengthening the wheel base of a tractor, wherein the tractor is normally formed of two connected units with the steering and clutch mechanisms carried by one unit and the transmission mechanism is carried by the other unit, and wherein the control mechanism for the steering and clutch mechanisms is normally carried by the transmision mechanism unit, a casing interposed between said units and having a length to provide the added portion of the length of the wheel base, and an extension drive shaft extending between the units through the casing, said casing having a formation to form a support for the control mechanism for the steering and clutch mechanisms.

2. An assembly as in claim 1 characterized in that the units are additionally connected by a frame positioned above the top plane of the casing, the frame being supported by the front unit to overlie a major portion of said unit, and being supported on the rear axle to overlie the rear unit.

3. An assembly as in claim 1 characterized in that the units are additionally connected by a frame positioned above the casing, said frame being supported by the front unit to overlie a major portion of said unit, and being supported on the rear axle to overlie the rear unit, and controls for the control mechanisms carried by the frame.

4. An assembly as in claim 1 characterized in that the units are additionally connected by a frame positioned above the casing, said frame being supported by the front unit to overlie a major portion of said unit, and being supported on the rear axle to overlie the rear unit, a cab carried by the frame over said interposed section, and controls operative within the cab for manipulating the control mechanisms.

5. Means for increasing the wheel base of a tractor having separable parts, one of which includes a dash assembly, said means comprising an interposed part to which the dash assembly is transferred, an extension drive shaft in said interposed part, and control devices at the dash assembly for the separated parts of the tractor.

6. A tractor as claimed in claim 5, and a frame on said separated parts provided with trailer and vehicle coupling means.

7. A tractor as claimed in claim 5, and a frame over said tractor parts, a cab on said frame at the dash assembly, and trailer and vehicle coupling means on said frame.

8. An assembly as in claim 1 characterized in that the units are additioally connected by a frame positioned above the casing, said frame being supported by the front unit to overlie a major portion of said unit, and being supported on the rear unit to overlie such rear unit, a cab carried by the frame and positioned above said interposed casing and having a portion projecting over the rear unit, and controls operative within the cab for manipulation of the control mechanisms.

9. An assembly as in claim 1 characterized in that the units are additionally connected by a frame positioned above the casing, said frame being supported by the front unit to overlie a major portion of said unit, and being supported on the rear unit to overlie such rear unit, controls operative within the cab for manipulation of the control mechanisms, and a coupling device carried by said frame above the rear unit.

10. An assembly as in claim 1 characterized in that the units are additionally connected by a frame positioned above the casing, said frame being supported by the front unit to overlie a major portion of said unit, and being supported on the rear unit to overlie such rear unit, a cab carried by the frame and positioned above said interposed casing and having a portion projecting over the rear unit, controls operative within the cab for manipulation of the control mechanisms, and a coupling device carried by said frame above the rear unit, said device extending beneath the projecting portion of the cab.

In testimony whereof I affix my signature in presence of two witnesses.

SIDNEY B. WINN.

Witnesses.
KARL H. BUTLER,
ANNA M. DORR.